United States Patent [19]

Kwapisz

[11] Patent Number: 5,538,375
[45] Date of Patent: Jul. 23, 1996

[54] MILLING HEAD COMPRISING A SWIVELABLE SPINDLE-HOLDER

[75] Inventor: Jean Kwapisz, Albert, France

[73] Assignee: Henri Line (S.A.), France

[21] Appl. No.: 333,736

[22] Filed: Nov. 3, 1994

[30] Foreign Application Priority Data

Nov. 4, 1993 [FR] France .................................. 93 12383

[51] Int. Cl.⁶ ........................................................ B23C 1/12
[52] U.S. Cl. ........................... 409/201; 409/211; 409/216
[58] Field of Search ..................................... 409/201, 204, 409/211, 215, 216; 29/33 R, 38, 39, 40

[56] References Cited

U.S. PATENT DOCUMENTS

| 1,796,079 | 3/1931 | Boyle | 409/108 |
|---|---|---|---|
| 4,589,174 | 5/1986 | Allen | 29/33 R |
| 4,657,453 | 4/1987 | Goulot et al. | 409/216 |
| 5,238,340 | 8/1993 | Ochiai et al. | 409/201 |

FOREIGN PATENT DOCUMENTS

| 1304586 | 4/1962 | France | 409/211 |
|---|---|---|---|
| 2107710 | 5/1972 | France | |
| 2131763 | 11/1972 | France | |
| 2735120 | 2/1979 | Germany | |
| 3630260 | 4/1987 | Germany | |
| 59-182037 | 10/1984 | Japan | |
| 60-67054 | 4/1985 | Japan | |
| 222809 | 9/1989 | Japan | 409/211 |

*Primary Examiner*—William Briggs
*Attorney, Agent, or Firm*—Ladas & Parry

[57] ABSTRACT

The milling head (1) comprises:

a principal body (2), an interposed piece (5), which is mounted to rotate on the principal body (2) and which is equipped with a first crown gear (12a), means for driving and for blocking in rotation the interposed piece (5) with respect to the body (2), a spindle-holder (3), which is mounted to rotate along axis XX' with respect to the interposed piece (5), on which is fixed a second crown (12b) adapted to mesh with the first crown (12a), and which is mobile in translation along axis XX' between a position of blockage in rotation in which the crown gears (12a, 12b) mesh in one another, and a position of setting in rotation in which the two crown gears (12a, 12b) are out of mesh, means (13) for setting in translation the spindle-holder (3) between the positions of blockage and of setting in rotation, and means (17, 18, 19) for setting in rotation the spindle-holder (3) along axis XX'.

The axis of rotation of the interposed piece (5) with respect to the principal body (2) merges with the axis of rotation XX' of the spindle-holder (3), and the means for driving and blocking this interposed piece (5) in rotation allow its continuous adjustment in rotation by any angle along axis XX'.

6 Claims, 2 Drawing Sheets

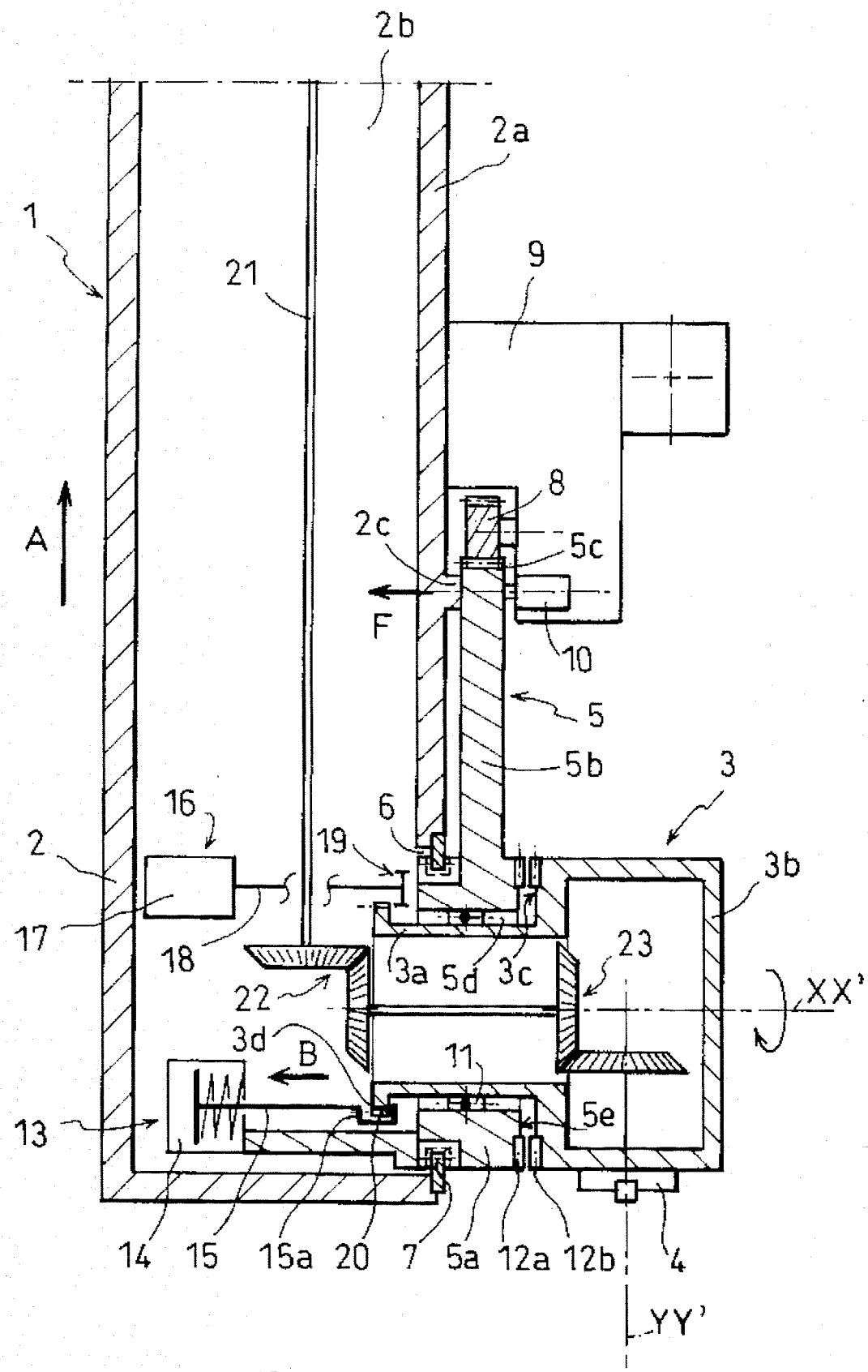
FIG_1

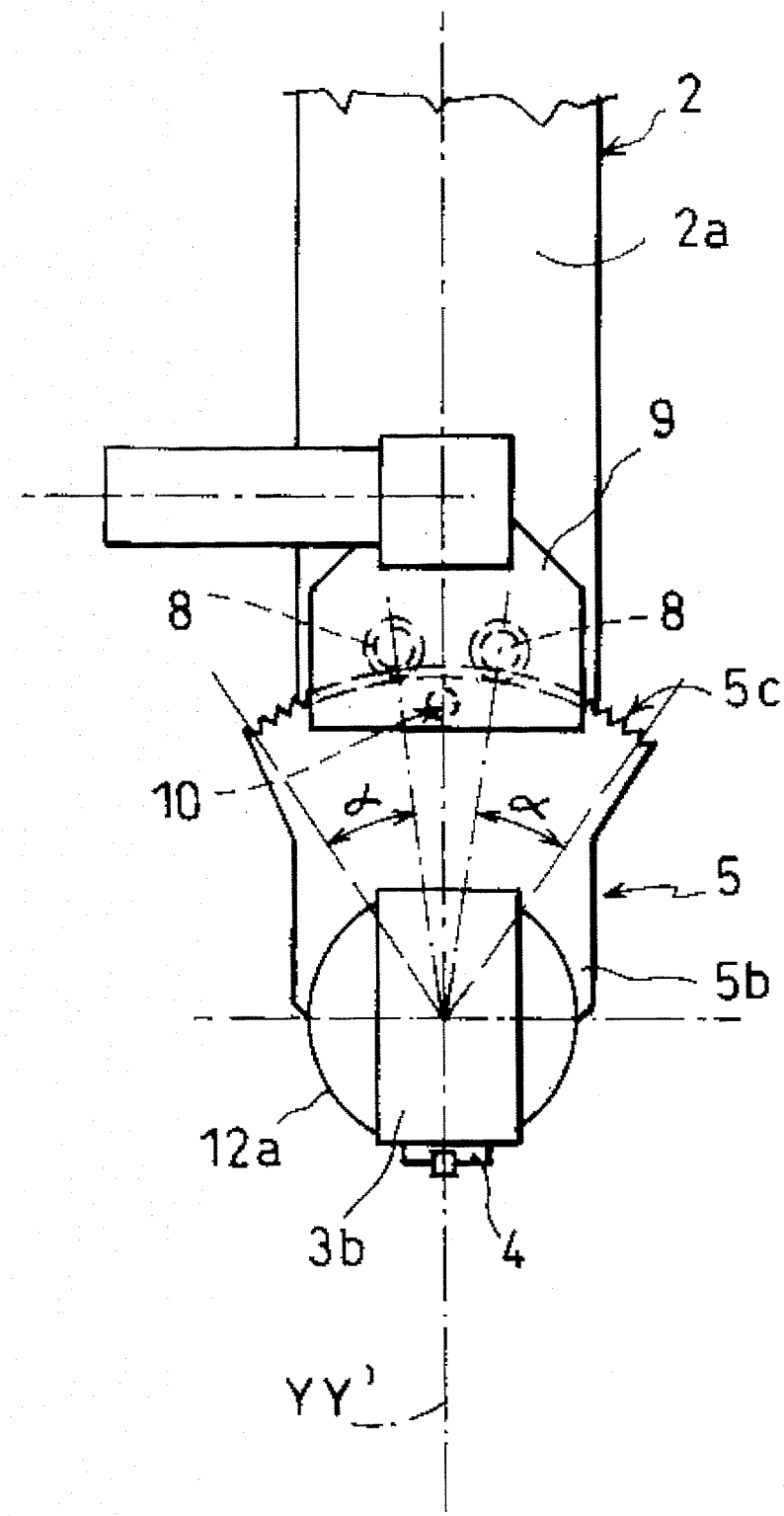
FIG_2

MILLING HEAD COMPRISING A SWIVELABLE SPINDLE-HOLDER

FIELD OF THE INVENTION

The present invention has for its object a tool-holder device, of the milling head type, comprising a body for its adaptation on a machine-tool, and a spindle-holder, which is intended to receive a tool-holder spindle, and which is mounted to rotate with respect to the body of the tool-holder device. It relates more particularly to a tool-holder device improved in that the spindle-holder is of the crown-gear type, but may be placed in an angular position which is not necessarily proportional to the distance between two teeth of the crown gear.

TECHNOLOGICAL BACKGROUND OF THE INVENTION

In the domain of tool-holder devices, and more particularly milling heads, two types of devices having a rotatable spindle-holder exist. According to the first type of device, angular positioning of the spindle-holder may be effected in a range of angular variation of 360°, but is necessarily equal to a given angle, for example 1°, 1°15', 1° 30', etc., or a multiple of this angle. This is due to the fact that the tool-holder is blocked in position with respect to the body of the tool-holder device, via two crown gears, which mesh in one another, one being fixed on the body of the device, the other being fixed on the spindle-holder. Angular positioning of the spindle-holder is effected in a first step by slightly offsetting the spindle-holder in the direction of its axis of rotation so as to place the two crown gears out of engagement, then, in a second step, setting the spindle-holder thus released by a predetermined angle in rotation, and finally, in a third step, returning the spindle-holder into a position of blockage, in which the two crown gears mesh in one another. It will be understood that the relative positioning of the spindle-holder with respect to the body of the tool-holder device may be effected only by an incremental rotation corresponding at minimum to one tooth of the crown gears. The minimum angular positioning is therefore a function of the number of teeth of the two crown gears.

This first type of tool-holder device has for example already been described in German Patent Application published under No. DE 36 30260. The spindle-holder of the device described in this document possesses a double incremental rotation, in two perpendicular axes. It may therefore be adjusted in rotation in each of its two directions, but for each of these directions, the angular positioning is a function of the number of teeth of the coupling crown gears.

According to the second type of device, angular positioning of the spindle-holder is obtained along any angle by a continuous rotation of the spindle-holder. Japanese Patent Application of the firm TOSHIBA, published under number JP 59 182 037, describes a machine-tool head which, in manner similar to the device of document DE 36 30260, comprises a spindle-holder possessing a double rotation, along two perpendicular axes, but for which the means for setting in rotation along each axis allow a continuous angular adjustment of the spindle-holder.

Applicants' object is to propose a tool-holder device which is of the first type mentioned above, i.e. a tool-holder device allowing an incremental angular positioning of its spindle-holder, but which overcomes the principal drawback thereof by allowing an angular positioning of this spindle-holder by any angle between 0° and 360°.

SUMMARY OF THE INVENTION

This object is perfectly attained by the tool-holder device of the invention, which, in manner known particularly by document DE 36 30260, comprises:

a principal body which allows assembly of the device on a machine-tool, an interposed piece, which is mounted to rotate on the principal body and which is equipped with a first crown gear, means for driving and for blocking in rotation the interposed piece with respect to the principal body, a spindle-holder, which is mounted to rotate along axis XX' with respect to the interposed piece, on which is fixed a second crown adapted to mesh with the first crown, and which is mobile in translation along axis XX' between a position of blockage in rotation in which the crown gears mesh in one another, and a position of setting in rotation in which the two crown gears are out of mesh, means for setting in translation the spindle-holder between the positions of blockage and of setting in rotation, and means for setting in rotation the spindle-holder along axis XX'.

In characterizing manner according to the invention, the axis of rotation of the interposed piece with respect to the principal body merges with the axis of rotation XX' of the spindle-holder, and the means for driving and blocking this interposed piece in rotation allow its continuous adjustment in rotation by any angle along axis XX'.

In the device of the invention, the adjustment of the angular position of the spindle-holder with respect to the principal body may be obtained, in a first step, by adjusting the angle of rotation of the spindle-holder, with respect to the interposed piece, to a predetermined value which is a function of the toothing of the crown gears, and, in a second step, by adjusting the angle of rotation of the interposed piece, with respect to the body of the tool-holder device, to any value included within the range of rotation of the interposed piece. The combination of these two adjustments along the same axis advantageously makes it possible to obtain an adjustment in rotation of the spindle-holder, by any angle, included between 0° and 360°.

The principal advantage conferred by the tool-holder device of the invention resides in the fact that, to obtain an adjustment of the spindle-holder along axis XX', by any angle between 0° and 360°, it is not necessary that the interposed piece be able to have a rotation of 360°, contrarily for example to the spindle-holder of the document of document JP 59 182 037. In fact, being given that, according to the invention, the continuous rotation of this interposed piece is complementary of the incremental rotation of the spindle-holder, it suffices that the spindle-holder have a rotation of 360°, and that the interposed piece have a limited rotation, at least equal to the angular divergence between two teeth of a crown used for the coupling between the spindle-holder and the interposed piece. Now, for reasons of bulk, constructors are frequently obliged to limit the rotation of the interposed piece with which the spindle-holder is coupled, in order that this piece cannot disturb the machining work of the tool which is mounted on the spindle-holder. In the device of the invention, such limitation of the angular rotation of the interposed piece is in no case detrimental to an adjustment of the angular position of the spindle-holder, by any angle included between 0° and 360°.

Advantageously, the means for driving and blocking the interposed piece in rotation with respect to the body will therefore be designed to allow adjustment of the rotation of this piece, along axis XX', by any angle but within a limited range of values (−α, +α).

According to a particular variant embodiment, the interposed piece is a dissymmetrical piece with respect to axis XX', of which the edge most remote from axis XX' is a toothed edge having the form of an arc of circle centred on axis XX'; the means for driving the interposed piece in rotation comprise at least one pinion which meshes with the toothed edge of the interposed piece and which is controlled in rotation.

In the variant mentioned above, the means for blocking the interposed piece in rotation are advantageously constituted by a hydraulic jack adapted to compress the interposed piece against the principal body of the tool-holder device, in the vicinity of the toothed edge of the interposed piece.

The principal body of the tool-holder device is preferably hollow; the interposed piece and the wall of the principal body of the tool-holder device on which the interposed piece is mounted to rotate are traversed by the spindle-holder; and the means for driving the spindle-holder in rotation and/or translation are placed inside the principal body of the tool-holder device.

When the principal body acts as housing for the means for driving the spindle-holder in rotation along axis XX', and in order that these means do not hinder rotation of the interposed piece when the spindle-holder is coupled to this piece via crown gears, it is preferable, on the one hand, that, in its position of blockage in rotation, the spindle-holder be uncoupled from its means for driving in rotation along axis XX', and, on the other hand, that, in its position of setting in rotation, the spindle-holder be coupled to its means for driving in rotation.

BRIEF DESCRIPTION OF THE FIGURES

Other characteristics and advantages of the invention will appear from the following description of a preferred embodiment of a sliding milling head according to the invention, given by way of non-limiting example, with reference to the accompanying drawings, in which:

FIG. 1 is a view in section of a milling head whose body serves as housing for the means for driving in rotation and the means for translation of the spindle-holder.

And FIG. 2 is a front view of the milling head of FIG. 1.

DESCRIPTION OF A PREFERRED EMBODIMENT

Referring to FIG. 1, the milling head 1 comprises a principal body 2 which is a hollow tube of internal cavity 2b and capable of being mounted to slide on a milling machine in the direction of arrow A. This body 2 serves as support for a spindle-holder 3 with crown gear, mounted to rotate along an axis XX'. On this spindle-holder 3 is fixed a spindle 4 intended to receive a milling cutter (not shown) rotating along an axis YY' perpendicular to axis XX'.

According to the invention, the angle of rotation along axis XX' of the spindle-holder 3 of the milling head which will be described at present may be adjusted by any angle between 0° and 360°, although the spindle-holder 3 is with crown gear.

This is obtained by means of an interposed piece 5 which is mounted to rotate along axis XX', between the wall 2a of the body 2 and the spindle-holder 3. More particularly, the interposed piece 5 is a dissymmetrical piece whose lower part 5a has passed through an opening 6 made in the wall 2a of the body 2 and whose upper part 5b is a plate which is positioned outside the hollow body, in the vicinity of and in a plane substantially parallel to the wall 2a, when the lower part 5a is mounted through the wall 2a of the body 2. Guiding of the interposed piece 5 in rotation along axis XX' is effected by means of an orientation ring 7 positioned between the lower part 5a of the interposed piece 5 and the edges of the opening 6 of the wall 2a.

Referring to FIG. 2, the upper edge 5c of the plate constituting the upper part 5b and which is the edge most remote from axis XX', is a toothed edge having the form of an arc of circle, which is centred on axis XX'. Rotation of the interposed piece 5 about axis XX' is effected by means of two pinions 8 which are controlled in rotation and which mesh with the toothing of the upper edge 5c of the interposed piece 5. These two pinions 8 are fast with a box 9 which is fixed to the wall 2a and which contains the pinion-motorization means. These means being, moreover, known to the man skilled in the art, they will not be described in the present specification.

In FIG. 2, the interposed piece 5 is in its initial position. The toothed edge 5c, in arc of circle, is positioned symmetrically with respect to axis XX'. The two pinions 8 likewise being symmetrical one to the other with respect to this axis XX', they each define an angle α with that end of the upper edge 5c which is proximal thereto. Thus, depending on the direction of rotation of the pinions 8, it is possible to adjust the rotation of the interposed piece 5 along axis XX' by any angle between 0° and +α, or between 0° and −α. Of course, it is possible, without departing from the scope of the invention, to replace these two pinions 8 by a single pinion located vertical to the axis XX', or by three pinions or more, distributed symmetrically with respect to axis XX'.

It is important to note that, when the angle of rotation of the interposed piece 5 is adjusted to its maximum value, the upper part 5b must not disturb the work of the tool which is mounted on the spindle 4. Consequently, the value of the angle α is necessarily limited. In practice, this angle α is about 25°.

The milling head 1 also comprises means for blocking the interposed piece 5 in rotation, which are constituted by a hydraulic jack 10, which is mounted inside the box 9 and which makes it possible to compress the upper part 5b of the interposed piece 5 against a setback 2c of the wall 2a of the body 2. Advantageously, in order to benefit most from the lever effect with respect to axis XX', this hydraulic jack 10 is positioned so as to apply a force of pressure F on the upper part 5b of the interposed piece 5, at the level of the upper edge 5c.

The spindle-holder 3 is a hollow body, constituted by a cylindrical part 3a and by a spindle-holder part 3b proper, having the form of a rectangular parallelepiped. The respective axes of these two parts 3a and 3b are perpendicular.

The cylindrical part 3a is mounted through an opening 5d in the lower part 5a of the interposed piece 5 and therefore also through the opening 6 in the wall 2a of the body 2 so that the axes of the cylindrical (3a) and spindle-holder (3b) parts respectively merge with the axes XX' and YY'. The spindle-holder 3 is guided in rotation along axis XX' by means of a roller crown ring 11 placed between the outer surface of the cylindrical part 3a and the edges of the opening 5d of the lower part 5a of the interposed piece 5.

On the outer face 5e of the lower part 5a of the interposed piece 5 is fixed a crown gear 12a. On the face 3c of the spindle-holder part 3b, which is adjacent face 5e, there is fixed, opposite the first crown gear 12a, a second, identical, crown gear 12b. The two crown gears 12a and 12b are therefore adapted to mesh in one another so as to block in rotation the spindle-holder 3 with respect to the interposed piece 5.

Referring to FIG. 1, the milling head further comprises means 13 for setting the spindle-holder 3 in translation in the direction of axis XX'. These means 13 for setting in translation consist of a hydraulic jack 14 which is placed inside the body 2 and is fixed to the lower part 5a of the interposed piece 5. The end 15a of the rod 15 of this hydraulic jack 14 is in U-form. The edge of the first cylindrical part 3a which is opposite the second part 3b, and which is located inside body 2, forms a flange 3d which is fitted in the U of the end 15a, with a sufficient clearance to allow rotation of the spindle-holder along axis XX'.

When the hydraulic jack 14 is actuated, the rod 15 undergoes a movement of translation in the direction of arrow B. The end 15a of the rod 15, in its movement of translation, abuts against the flange 3d of the cylindrical part 3a. The spindle-holder is therefore also driven in translation in the direction of arrow B. The two crown gears 12a and 12b which were disconnected approach each other until they mesh in each other; the spindle-holder is blocked in rotation with respect to the interposed piece 5. This so-called position of blockage in rotation is the one illustrated in FIG. 1. Inversely, when the hydraulic jack 14 is unblocked, the rod 15 and consequently the spindle-holder 3 undergo a slight movement of translation along axis XX', in the direction opposite arrow B. The hydraulic jack 14 is designed so that the axial clearance of the spindle-holder 3 is sufficient for the two crowns 12a and 12b to be out of mesh when the hydraulic jack is at the end of stroke. When the two crown gears 12a, 12b are out of mesh, the spindle-holder 3 is free to rotate along axis XX'. This position of the spindle-holder which is not illustrated is called position of setting in rotation.

Referring to FIG. 1, the milling head 1 also comprises, inside the body 2, means 16 for driving the spindle-holder 3 in rotation. These means for driving in rotation consist of a gear motor 17, driving in rotation a pin 18 at the end of which is mounted a pinion 19. Furthermore, the edge 3d of the first cylindrical part of the spindle-holder 3 is provided over the whole of its periphery with a toothing 20 corresponding to the teeth of the pinion 19. When the spindle-holder 3 is in position of setting in rotation, the pinion 19 meshes in the toothing of the edge 3d, with the result that control of rotation of this pinion 19 brings about rotation of the spindle-holder 3 along axis XX'. When the spindle-holder 3 is in position of blockage in rotation, as illustrated in FIG. 1, due to the translation which the spindle-holder 3 has undergone in the direction of arrow B, the pinion 19 no longer meshes in the toothing 20. In this way, in this position of blockage in rotation of the spindle-holder 3, rotation of the interposed piece 5 itself provokes rotation of the spindle-holder 3 along axis XX', which is not hindered by the pinion 19.

For setting the spindle 4 in rotation, along axis YY', the milling head 1 further comprises, housed inside the body 2 and the spindle-holder 3, means for setting in rotation consisting in a transmission shaft 21 controlled in rotation by a gear box (not shown) and which controls rotation of two conical gear couples 23 for setting the tool-holder spindle 4 in rotation along axis YY'.

The process for adjustment of the angle of rotation of the spindle-holder 3 along axis XX', to any predetermined value β comprises two steps:

Step 1: Adjustment of the angle of rotation of the spindle-holder 3 with respect to the interposed piece 5, to a value β', which is a multiple of the minimum incremental angle of rotation of the two crowns 12a and 12b, and which is the closest possible to value β.

This step 1 can be broken down into the following successive steps:

1.1. Control of the translation means 13, and more particularly of the hydraulic jack 14 so as to place crowns 12a and 12b out of mesh (position of setting in rotation of the spindle-holder 3);
1.2. Control of the rotation of the spindle-holder 3 at value β', with the aid of the means 16 for driving in rotation;
1.3. Control of the translation means 13, and more particularly of the hydraulic jack 13, so as to bring the spindle-holder 3 into position of blockage in rotation.

Step. 2: Adjustment of the angle of rotation of the interposed piece 5 with respect to the body 2 to a value β", worth (β—β').

This step 2 can be broken down into the following successive steps:

2.1. Control of the hydraulic jack 10, so as to unblock the upper part 5b of the interposed piece 5, with respect to the wall 2a of the body 2;
2.2. Control of the rotation of the interposed piece 5, at value β", by means of pinions 8;
2.3. Control of the hydraulic jack 10 for blockage in rotation of the interposed piece 5, with respect to the wall 2a of the body 2.

It should be noted that, to carry out steps 1.2. and 2.2., it is preferable to equip the gear motor 17 and the pinions 8 respectively with sensors of incremental coder type, so as to know, respectively, the angular position of the spindle-holder 3 with respect to the interposed piece 5, and of the interposed piece 5 with respect to the body 2. Furthermore, the means controlling the gear motor 17 and the pinions 8 in order to obtain the desired angular positioning respectively of the spindle-holder 3 with respect to the interposed piece 5 and of the interposed piece 5 with respect to the body 2, as a function of the data delivered by these sensors, are already known to the man skilled in the art and will therefore not be described in detail in the present specification.

The invention is not limited to the particular embodiment of a milling head which has just been described, but may be adapted to any type of tool-holder device comprising a spindle-holder with crown gear.

I claim:

1. Tool-holder device, particularly milling head, which comprises:

a principal body which allows assembly of the device on a machine-tool, an interposed piece (5), which is mounted to rotate on the principal body and which is equipped with a first crown gear, means for driving and for blocking in rotation the interposed piece with respect to the body, a spindle-holder, which is mounted to rotate along axis XX' with respect to the interposed piece, on which is fixed a second crown adapted to mesh with the first crown, and which is mobile in translation along axis XX' between a position of blockage in rotation in which the crown gears mesh in one another, and a position of setting in rotation in which the two crown gears are out of mesh, means for setting in translation the spindle-holder between the positions of blockage and of setting in rotation, and means for setting in rotation the spindle-holder along axis XX', characterized in that the axis of rotation of the interposed piece with respect to the principal body merges with the axis of rotation XX' of the spindle-holder, and in that the means for driving and blocking this interposed piece in rotation allow its continuous adjustment in rotation by any angle along axis XX'.

2. Device according to claim 1, characterized in that the means for driving and blocking the interposed piece in rotation with respect to the principal body are designed to allow adjustment of the rotation of this piece, along axis XX', by any angle but within a limited range of values ($-\alpha$, $+\alpha$).

3. Device according to claim 2, characterized in that the interposed piece is a dissymetically piece with respect to axis XX', of which the edge most remote from axis XX' is a toothed edge having the form of an arc of circle centred on axis XX', and in that the means for driving the interposed piece in rotation comprise at least one pinion which meshes with the toothed edge of the interposed piece and which is controlled in rotation.

4. Device according to claim 3, characterized in that the means for blocking the interposed piece in rotation are constituted by a hydraulic jack adapted to compress the interposed piece against the principal body of the tool-holder device, in the vicinity of the toothed edge of the interposed piece.

5. Device according to one of claims 1 to 4, characterized in that the principal body of the tool-holder device is hollow, in that the interposed piece and the wall of the principal body of the tool-holder device on which the interposed piece is mounted to rotate are traversed by the spindle-holder, and in that the means for driving the spindle-holder in rotation and/or translation are placed inside the principal body of the tool-holder device.

6. Device according to claim 5, characterized in that, in its position of blockage in rotation, the spindle-holder is uncoupled from its means for driving in rotation along axis XX' and in that, in its position of setting in rotation, the spindle-holder is coupled to its means for driving in rotation.

* * * * *